US007813262B1

(12) United States Patent
Rao

(10) Patent No.: US 7,813,262 B1
(45) Date of Patent: Oct. 12, 2010

(54) MULTIPLE INPUT MULTIPLE-OUTPUT ORTHOGONAL FREQUENCY-DIVISION MULTIPLEXING MODULATOR

(75) Inventor: Raghavendar Mysore Rao, Austin, TX (US)

(73) Assignee: Xilinx, Inc., San Jose, CA (US)

(*) Notice: Subject to any disclaimer, the term of this patent is extended or adjusted under 35 U.S.C. 154(b) by 980 days.

(21) Appl. No.: 11/633,919

(22) Filed: Dec. 5, 2006

(51) Int. Cl.
*H04J 11/00* (2006.01)

(52) U.S. Cl. ..................................................... 370/208

(58) Field of Classification Search ......... 370/203–210, 370/328–339, 412
See application file for complete search history.

(56) References Cited

U.S. PATENT DOCUMENTS 7,095,709 B2 * 8/2006 Walton et al. ............... 370/208

OTHER PUBLICATIONS

Yu et al, Design and Prototype Development of MIMO-OFDM for Next Generation Wireless LAN, IEEE, pp. 1134-1142, Nov. 2005.*

Manavi et al, Implementation of OFDM modem for the Physical Layer of IEEE 802.11a Standard Based on Xilinx Virtex-II FPA, IEEE, pp. 1768-1772, 2004.*

Mostafa et al, Design and Implementation of a DSP-Based MIMO System Prototype for Real-Time Demonstration and Indoor Channel Measurements, EURASIP Journal, pp. 2673-2685, 2005.*

Vahid Tarokh et al., "Space-Time Block Codes from Orthogonal Designs"; Copyright 1999 IEEE; IEEE Transactions on Information Theory; vol. 45; No. 5; Jul. 1999; pp. 1456-1467.

Siavash M. Alamouti; "A Simple Transmit Diversity Technique for Wireless Communications"; Copyright 1999 IEEE; IEEE Journal on Select Areas in Communications; vol. 16; No. 8; Oct. 1998; pp. 1451-1458.

* cited by examiner

*Primary Examiner*—Frank Duong
(74) *Attorney, Agent, or Firm*—W. Eric Webostad; Lois D. Cartier

(57) ABSTRACT

Multiple-Input, Multiple-Output Orthogonal Frequency Division Multiplexing ("MIMO-OFDM") modulation is described. An integrated circuit has blocks of memory of a fixed size. A physical layer block is configured for MIMO-OFDM. The physical layer block is a single MIMO-OFDM block for supporting transmitting via a plurality of antennas. The physical layer block includes buffers configured for storing sets of symbols at a time for transmitting via the plurality of antennas.

18 Claims, 8 Drawing Sheets

109 CONFIG / CLOCK DISTRIBUTION 109
MGTs 101
CLBs 102
BRAMs 103
IOBs 104
PROC 110
OTHER 108
I/O 107
CONFIG / CLOCKS 105
DSPs 106
INT 111
CLE 112
DSPL 114
BRL 113
IOL 115
100
102
103 or 106
104

600A $$\begin{bmatrix} c_1 & c_2 \\ -c_2^* & c_1^* \end{bmatrix}$$

FIG. 6A

600B $$\begin{bmatrix} 1 & 1 \\ 1 & 1 \\ -1 & 1 \\ 1 & -1 \end{bmatrix}$$

FIG. 6B

600C $$\begin{bmatrix} c_1 & c_2 & c_3 \\ -c_2^* & c_1^* & 0 \\ c_3^* & 0 & -c_1^* \\ 0 & -c_3^* & c_2^* \end{bmatrix}$$

FIG. 6C

600D $$\begin{bmatrix} c_1 & c_2 & c_3 & c_4 \\ -c_2 & c_1 & -c_4 & c_3 \\ -c_3 & c_4 & c_1 & -c_2 \\ -c_4 & -c_3 & c_2 & c_1 \\ c_1^* & c_2^* & c_3^* & c_4^* \\ -c_2^* & c_1^* & -c_4^* & c_3^* \\ -c_3^* & c_4^* & c_1^* & -c_2^* \\ -c_4^* & -c_3^* & c_2^* & c_1^* \end{bmatrix}$$

FIG. 6D

MULTIPLE INPUT MULTIPLE-OUTPUT ORTHOGONAL FREQUENCY-DIVISION MULTIPLEXING MODULATOR

FIELD OF THE INVENTION

One or more aspects of the invention relate generally to integrated circuits and, more particularly, to Multiple-Input, Multiple-Output Orthogonal Frequency Division Multiplexing ("MIMO-OFDM").

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing, blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Although the following description is in terms of FPGAs, it should be understood that other Application Specific Standard Products ("ASSPs"), as well as Application Specific Integrated Circuits ("ASICs"), may be used for wireless communication functions. Furthermore, it should be appreciated that FPGAS, as well as other ASSPs, and ASICs may have discretely sized memory blocks.

For purposes of clarity, FPGAs are described below though other types of PLDs may be used. FPGAs may include one or more embedded microprocessors. For example, a microprocessor may be located in an area reserved for it, generally referred to as a "processor block."

Multiple-input, multiple-output orthogonal frequency division multiplexing ("MIMO-OFDM") systems are gaining popularity. For example, MIMO-OFDM systems are making their way into more recent wireless communication standards such as IEEE 802.11n, 802.16, and 802.16e, among other known or proposed standards. Many of these MIMO-OFDM systems involve varying Fourier transform sizes, data rates, antenna configurations, and MIMO modulation schemes. Examples of MIMO modulation schemes include Space-Time Block Code ("STBC") and spatial multiplexing, among other known MIMO modulation schemes.

Heretofore, an STBC encoder for a two-antenna transmitter system encoded two streams of symbols over two time intervals and stored the two streams of symbols over such two time intervals modifying such symbols in each time interval, namely a block length of two. This meant that for a MIMO-OFDM modulator, all samples of the OFDM symbol for each antenna were stored over multiple OFDM symbol intervals. For example, for a three-antenna transmitter system, the STBC block length is four and thus the samples are stored for four symbol intervals. Furthermore, for a four-antenna transmitter system, the block length increases to eight symbol intervals. Thus, conventionally, there may be a one-to-one correspondence of OFDM blocks with antennas. Furthermore, there may be a one-to-one correspondence between memory and antennas for an STBC encoder. In any of these instances, the amount of circuitry significantly increases as the number of antennas increase. Furthermore, if the memory is provided in discrete sizes significantly larger than the amount of buffer space used for each antenna, a significant amount of storage goes unused. Thus, as the number of antennas increases, not only do the circuit resources increase but also the amount of unused or wasted circuit resources associated with memory utilization may also increase.

Accordingly, it would be desirable to provide a MIMO-OFDM modulator that is efficient in data storage to effectively reduce the amount of unused or wasted memory resources.

SUMMARY OF THE INVENTION

One or more aspects of the invention relate generally to integrated circuits and, more particularly, to Multiple-Input, Multiple-Output Orthogonal Frequency Division Multiplexing ("MIMO-OFDM").

An aspect of the invention is an integrated circuit having blocks of memory of a fixed size. A physical layer block is configured for MIMO-OFDM. The physical layer block is a single MIMO-OFDM block for supporting transmitting via a plurality of antennas. The physical layer block includes buffers configured for storing sets of symbols at a time for transmitting via the plurality of antennas.

Another aspect of the invention is a method for transmission of information via a single transmit path. Mapped symbols are obtained for the transmission of the information via antennas. The mapped symbols are first buffered. The mapped symbols are either spatial multiplexed or Space-Time Block Code ("STBC") encoded, the mapped symbols being divided responsive to the antennas and channels respectively associated therewith. Preamble symbols and frequency tracking symbols are inserted. The preamble symbols, the frequency tracking symbols, and the mapped symbols, whether spatially multiplexed or STBC encoded, are concatenated to provide a symbol grouping. The symbol grouping is second buffered, inverse Fourier transformed, spatial demultiplexed to an output buffer, and third buffered to the buffer, the third buffering taking place in a buffer circuit in the output buffer associated with one of the antennas. A system clock provided to the single transmit path is sufficiently higher in frequency than a sample clock for multiplexing multiple transmissions including the transmission onto the single transmit path.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

FIG. 6A is a matrix diagram depicting an exemplary embodiment of an Alamouti code matrix for two antennas.

FIG. 6B is a matrix diagram depicting an exemplary embodiment of an operand matrix.

FIG. 6C is a matrix diagram depicting an exemplary embodiment of an STBC encoding matrix for three transmitting antennas.

FIG. 6D is a matrix diagram depicting an exemplary embodiment of an STBC encoding matrix for four transmitting antennas.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different. Moreover, for ease of illustration, in some examples single blocks or signal lines are used, even though such single instances may represent multiple blocks or signal lines when implemented. Furthermore, for ease of illustration, one or more control signals are illustratively shown as being provided to a block, and not sub-blocks of such block, even though such sub-blocks may receive such one or more control signals.

Figure 1:
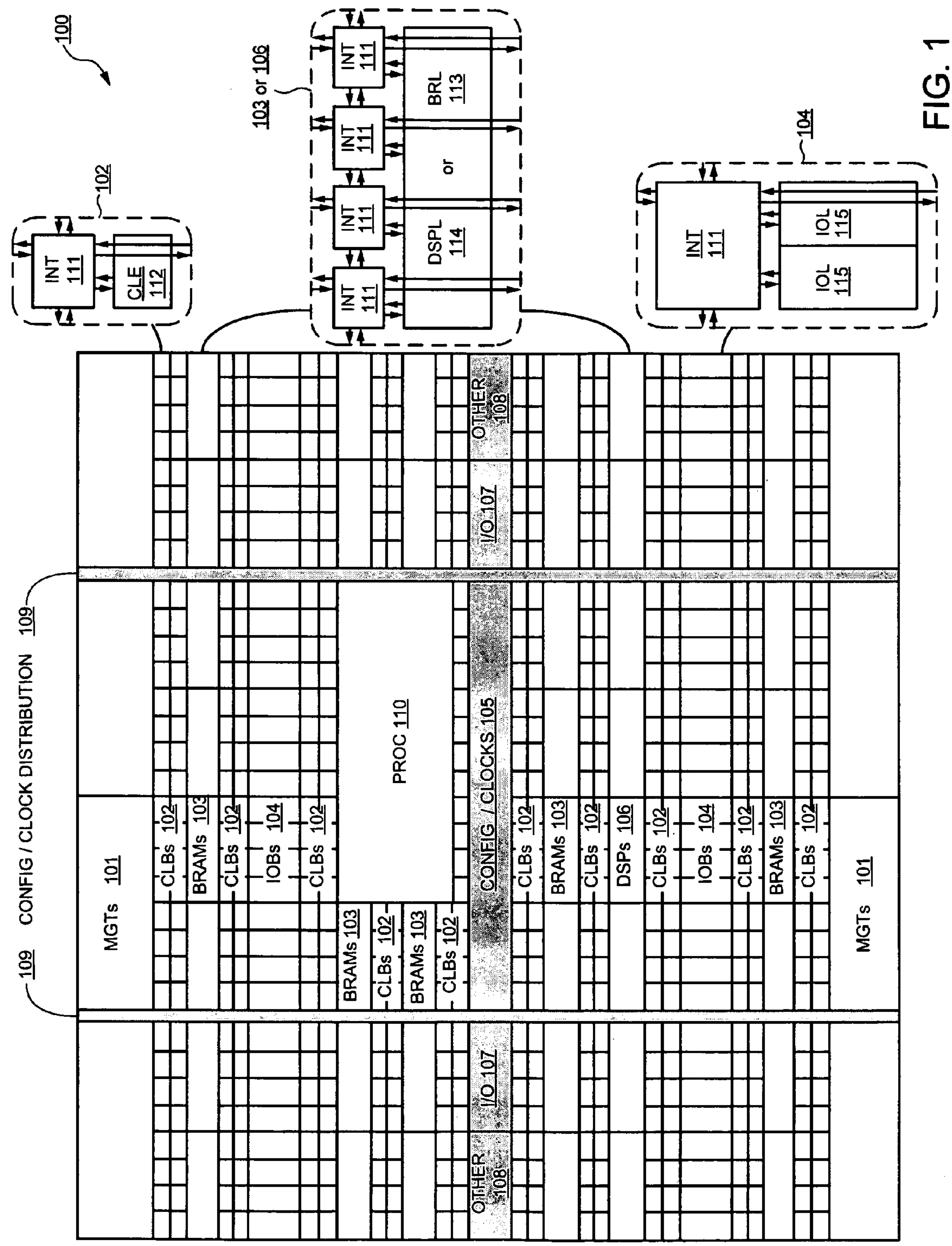
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

BRAMs 103 conventionally are all of a fixed memory storage array size, which can be configured into single or dual port RAMs of varying depth and word widths. BRAMs 103 may be cascaded to form larger memories but the size is a multiple of the original discrete size. BRAMs 103, while having a discrete size, have multiple ports for reading from and writing to such fixed memory storage array size. Furthermore, BRAMs 103 may be programmed to operate as First-in, First-out buffers ("FIFOs").

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-2™, Virtex-4™ or Virtex-5™ FPGA from Xilinx of San Jose, Calif.

It should be appreciated that FPGAs are popular for implementing communication systems, in particular for implementing a basestation portion of a "wireless" communication systems. For example, FPGAs have been gaining traction in implementing features associated with wireless communication specifications IEEE 802.11n, 802.16, and 802.16e, among others. This popularity is due at least in part to FPGAs having DSPs 106, as well as embedded memory such as BRAMs 103 and CLBs 102 that can be configured to implement any wireless communication system. Furthermore, FPGAs are relatively easily upgradeable for bug fixes and to accommodate revisions to communication standards.

FPGAs may operate at frequencies much higher than the baud rate of the communication system, e.g., in excess of 200 MHz, and therefore there is a significant differential between system clock rate and baud clock rate that allows many operations in a wireless communication system to be time multiplexed onto the same hardware resources.

For purposes of clarity and by way of example, a configurable MIMO-OFDM modulator is described for supporting Fast Fourier Transform ("FFT") sizes of 64, 128, 256, 512, 1024, and 2048, Binary Phase-Shift Keying ("BPSK"), and Quadrature Amplitude Modulation ("QAM") constellation sizes of 4, 16, and 64. The number of antennas in the configurable MIMO-OFDM modulator described may be anywhere from one to four. Moreover, the MIMO-OFDM modulator described is capable of any of a variety of known MIMO modulation schemes including STBC and spatial multiplexing. The MIMO-OFDM modulator described time multiplexes the operations of all antennas in a single MIMO modulator and OFDM modulator chain. By MIMO-OFDM modulator chain for example it is meant to include for example MIMO encoding, symbol mapping, pilot insertion and an Inverse Fast Fourier Transform ("IFFT"), among other operations associated with a MIMO-OFDM modulator. For this example, just one radix-4 IFFT may be implemented for all antennas used up to a number of four antennas. Thus, while this example is described, it shall be appreciated from the following description that variations, such as in IFFT point size, data rate, number of antennas, and MIMO modulation scheme, among other departures from the particular example, may be implemented in accordance with the scope of this disclosure.

Thus, it should be appreciated that the following description is not limited to the particular numerical examples used. In fact, a MIMO-OFDM modulator as described herein is configurable for adaptation to any of a variety of known standards, whether adopted or proposed. Notably, it is not suggested that every feature of every known or proposed standard is supported by a MIMO-OFDM modulator as described herein. Rather, as shall become more apparent from the following description, the more salient features of such standards are supported. As also shall become more apparent from the following description, implementation of a MIMO-OFDM modulator in a PLD, such as an FPGA, as described herein is not only configurable, but is also reconfigurable for adaptation to changes, such as evolution of standards, as well as capable of meeting performance parameters associated with such standards and the evolution thereof.

Figure 2:
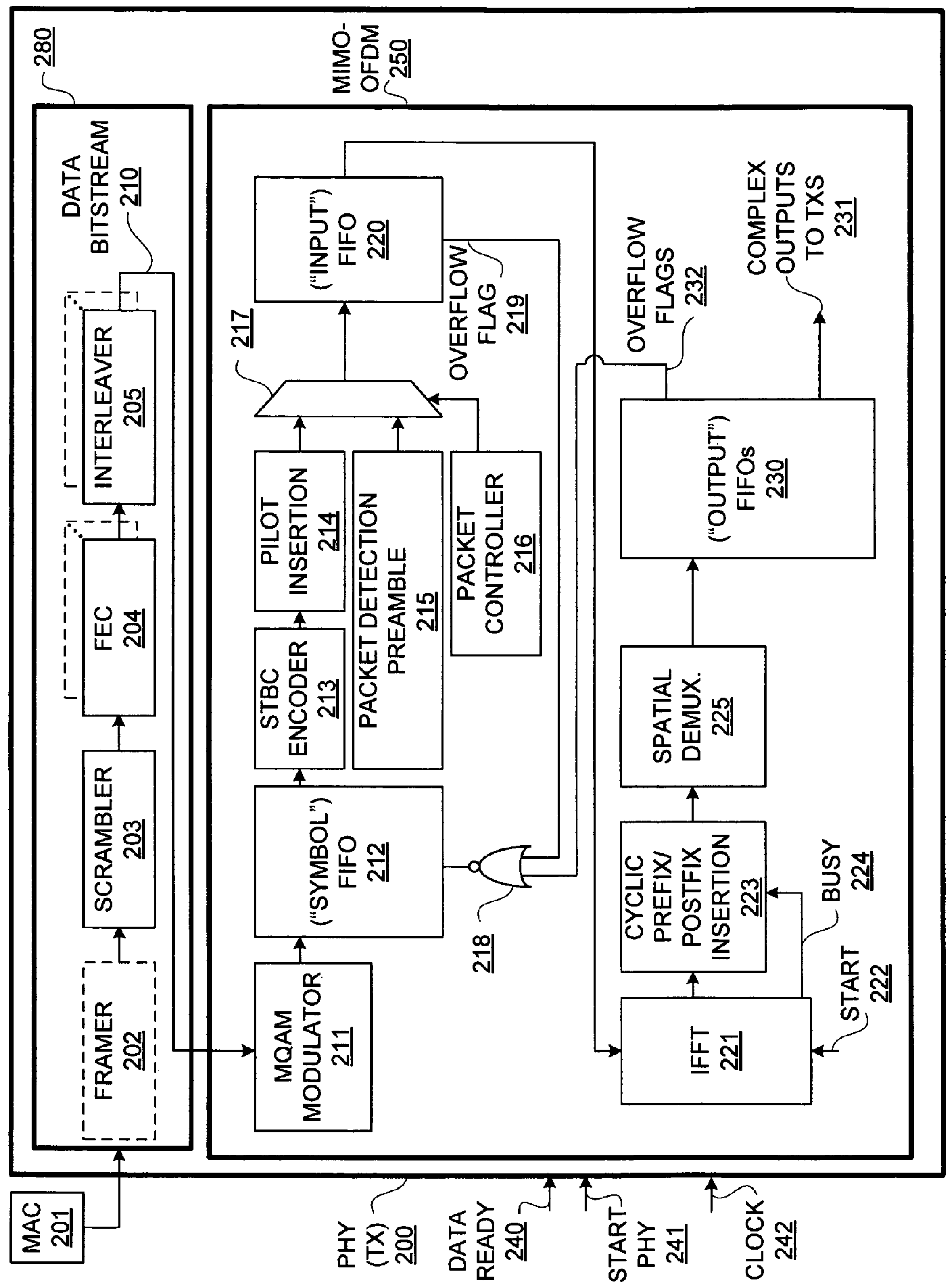
FIG. 2 is a block/circuit diagram depicting an exemplary embodiment of a media access controller coupled to a physical layer block.

FIG. 2 is a block/circuit diagram depicting an exemplary embodiment of a media access controller ("MAC") 201 coupled to a physical layer block ("PHY") 200. PHY 200 is for a transmission data path. MAC 201 presents information to PHY 200 for transmission. PHY 200 includes MIMO-OFDM block ("OFDM block") 250, as well as one or more precursor blocks 280 that may vary depending on the communication protocol being supported. Precursor blocks 280 may include a scrambler or randomizer ("scrambler") 203, a forward error correction ("FEC") block 204, and an interleaver 205, as well as optionally a framer 202.

In this example, information to be transmitted is provided from MAC 201 to scrambler 203. Optionally, framer 202 may precede scrambler 203 for receiving information from MAC 201. Notably, MAC 201 may provide bits of information for transmission to different users, such as different subscriber stations in a wireless communication system for example. Thus, such information for multiple users may be mapped to the appropriate channels or subcarriers using framer 202. The output of scrambler 203 is provided to a forward error correction ("FEC") block 204. Notably, FEC 204 may be implemented in one or more layers, and any of a variety of known types of FEC such as Reed-Solomon/Viterbi encoding, Turbo Code encoding (convolutional), and Turbo Product Code (product code) encoding, among others may be used.

The output of FEC block 204 is provided to interleaver 205. Interleaver 205 may include one or more levels of interleaving. The output of interleaver 205 is data bitstream 210. The combination of FEC encoding and interleaving is generally known as bit-interleaved coded modulation ("BICM"). Thus, it should be appreciated that output of precursor blocks 280 may be a BICM binary data bitstream 210.

Although PHY 200 may be implemented for frame-based communication with use of optional framer 202, the following description is in terms of packet-based communication. As the context of PHY 200 for packet-based communication is substantially similar to frame-based communication, one of ordinary skill in the art will understand that PHY 200 may be used for frame-based communication from the description of packet-based communication. Moreover, although the example as illustratively shown is for a packet-based communication, it should be appreciated that the architecture of OFDM block 250 may be modified for a continuous mode operation, namely a non-packet based communication system. Thus for example, OFDM block 250 may be modified for implementation in a continuous time system.

Although the term PHY 200 is used, it should be appreciated that PHY 200 is a MIMO-OFDM modulator. Parameters associated with a MIMO-OFDM system may be provided to PHY 200 by MAC 201 via control registers (not shown). Parameters that may be set via such control registers may for example include the number of subcarriers, the number of antennas, the QAM constellation size, and the packet structure, among other parameters. Parameters associated with the packet structure that may be set by control registers may for example include one or more of the number of training symbols, the amount of preamble, the pilot locations, or the cyclic prefix/postfix.

Data bit stream 210 is provided as an input to multiple-QAM ("MQAM") block ("modulator") 211. Thus, the "M" in front of "QAM" is to indicate an integer value, namely the constellation size of the QAM, which as indicated above may for example be 4, 16, or 64 for this example. In other words, bits of data bitstream 210 are grouped for assertion as QAM location to provide symbols. These symbols are thus mapped to amplitude as defined by a real axis and an imaginary axis, as is known. Mapped symbols output from modulator 211 are provided for storage, such as in a buffer memory, namely "symbol" first-in, first-out buffer ("symbol FIFO") 212.

Notably, rather than using MQAM as described herein, BPSK may be used. However, it should be appreciated for BPSK, a bit-for-bit correspondence between symbols and data bits is used. In contrast, for MQAM modulator 211 with constellation size M equal to 4, 16, or 64, multiple bits are associated with a symbol, which may be used to increase the throughput of the system.

Symbols output from symbol FIFO 212 are provided as input to STBC encoder 213. Notably, even though an STBC encoder 213 is illustratively shown, a spatial multiplexer may be used instead of STBC encoder 213. Generally, STBC encoder 213 is associated with an improved bit error rate ("BER"), and spatial multiplexing is associated with an increased capacity or throughput. Furthermore, rather than STBC encoding or spatial multiplexing, beam selection may be used.

The circuit resources used for a single OFDM block 250 may support multiple antennas, provided the circuit resources used to implement OFDM block 250 are clocked at a frequency significantly higher than the baud rate of the communication system. PHY 200, as well as OFDM block 250, may be clocked responsive to clock signal 242.

PHY 200 may receive a data ready control signal 240 to indicate that data is ready for PHY 200 and a start PHY control signal ("start PHY flag") 241 to start Inverse Fast Fourier transformation and to transfer modulated symbols to all transmitters.

STBC encoder 213 encodes symbols from symbol FIFO 212 for each antenna supported. An implementation of STBC encoder 213 is described below in additional detail with reference to STBC encoder 500 of FIG. 5. Output of STBC encoder 213 is provided to pilot insertion module 214. Pilot insertion module 214 inserts pilot information symbols, namely information about the transmitter system in which OFDM block 250 is located, into predefined subcarrier locations. As is known, the symbol or symbols inserted by pilot insertion module 214 are known by receivers which communicate with the transmitter system in which OFDM block 250 is implemented.

STBC-encoded symbols with one or more pilot symbols inserted are provided from pilot insertion module 214 as a data input to multiplexer 217. Another data input to multiplexer 217 is provided from packet detection preamble block 215. Packet detection preamble block 215 has a one or more symbols stored for a predefined preamble. Notably, the pilot information and the preamble information respectively of pilot insertion module 214 and packet detection preamble block 215 may vary depending on the communication protocol being supported.

The outputs of module 214 and block 215 are provided as data inputs to multiplexer 217. The output of packet controller 216 is provided as a control select signal to multiplexer 217. Responsive to the output from packet controller 216, STBC-encoded symbols with inserted pilot symbols and preamble symbols are selectively output from multiplexer 217 to concatenate such symbols as a packet of symbols in this example. Thus a stream of symbols may be output from multiplexer 217 for storage in an input buffer, namely “input” FIFO 220, in a packet sequence.

Figure 4:
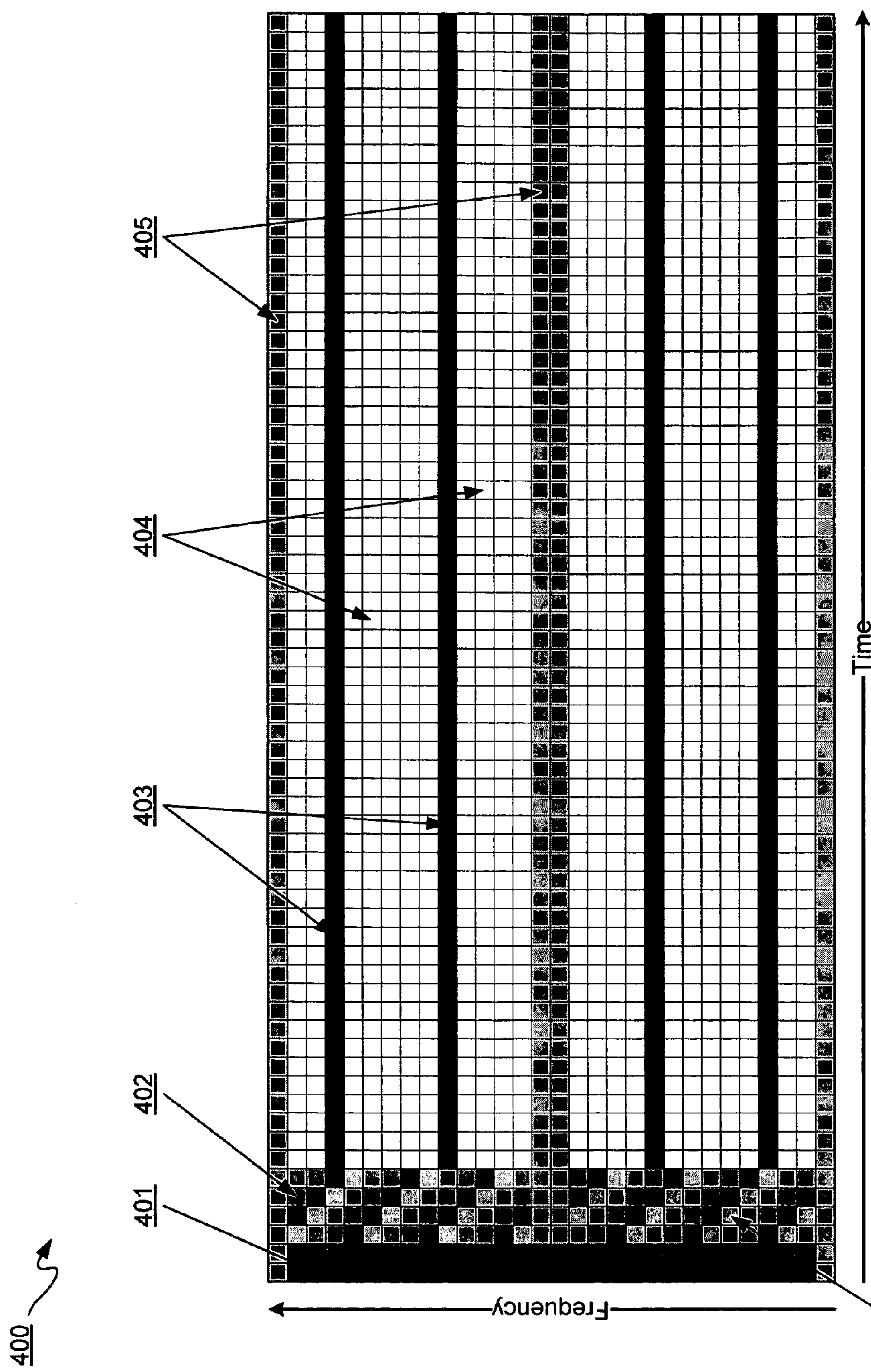
FIG. 4 is a plot of time versus frequency for depicting an exemplary embodiment of a packet structure.

FIG. 4 is a plot of time versus frequency for depicting an exemplary embodiment of a packet structure 400. Region 401 indicates symbols used for automatic gain control (“AGC”), packet detection, and block boundary acquisition information. Another term for block boundary acquisition is timing acquisition, as is known. Region 401 is associated with preamble information. Notably, region 401 is just an example of a preamble, which may vary from standard to standard. Preamble blocks of region 401 are inserted prior to channel estimation pilots of regions 402. However, channel estimation pilots of regions 402 may form part of the preamble symbols inserted by packet detection preamble block 215 of FIG. 2. Thus the first set of blocks of a preamble, namely preamble blocks of region 401, are generally associated with packet preamble information which may be identical for all antennas associated with PHY 200. It should be appreciated that frequency tracking pilots associated with regions 403 are not included as part of preamble information but that channel estimation pilots may be included as part of preamble information.

Following preamble blocks of region 401 are blocks for channel estimation pilots, namely blocks associated with regions 402. Blocks associated with channel estimation pilots of regions 402 may be structured such that only one antenna transmits on a respective subcarrier during each OFDM symbol period or interval. For example, antenna 1 may transmit during a first OFDM symbol interval on subcarrier 1, 4, 8, etc. Antenna 2 may transmit during the first OFDM symbol interval on subcarrier 2, 5, 9, etc. Similarly, antennas 3 and 4 during the first OFDM symbol interval may respectively transmit on subcarriers 3, 6, 10, etc. and 4, 7, 11, etc. In a second OFDM symbol interval, antenna 1 may transmit on subcarriers 2, 5, 9, etc., antenna 2 may transmit on subcarriers 3, 6, 10, etc., antenna 3 may transmit on subcarriers 4, 7, 11, etc., and antenna 4 may transmit on subcarriers 5, 8, 12, etc. Likewise, training symbol subcarriers may be rotated for each antenna for each OFDM symbol interval.

Following channel estimation pilots of regions 402 may be data symbols. Notably, blocks of regions 404 indicate payload of a packet, namely data symbols. During or between data blocks of regions 404 frequency tracking pilots may be embedded on predetermined subcarriers for carrier frequency offset tracking, sampler frequency offset tracking, and estimating and correcting a common phase error part of phase noise. These embedded continuous pilots or frequency tracking pilots are indicated as blocks of regions 403. As is known, for FCC compliance, there may be some banding to avoid interference with other transmissions. Accordingly, unused subcarriers at DC and at the band edges of a frequency band, indicated as blocks of regions 405, may allow for non-ideal filters in an analog front-end. Notably, in this example, guard bands indicated by blocks of regions 405 are inserted between blocks of regions 402.

With simultaneous reference to FIGS. 2 and 4, PHY 200 and packet structure 400 are further described. In the example of a packet mode communication system, packet structure 400 is a packet structure in which PHY 200 of FIG. 2 modulates symbols for transmission. Packet controller 216 is a state machine indicating the state of a packet currently being processed. At the beginning, packet controller 216 initiates passing of the preamble via packet detection preamble block 215 from multiplexer 217 for a packet. Packet controller 216 may keep track of the number of preamble symbols. This tracking of preamble symbols may be done by clock cycles, such as responsive to clock signal 242. Once the preamble information has been passed from multiplexer 217, channel estimation pilot symbols followed by STBC-encoded data symbols may be passed from multiplexer 217. Packet controller 216 may be implemented as a finite state machine.

Packet controller 216 may be coupled (not shown for clarity) to receive data ready signal 240 to initiate selection of output from multiplexer 217, and may be coupled (not shown for clarity) to receive clock signal 242 to track the sequence of information provided from multiplexer 217. In this example, AGC, packet detect, block boundary acquisition information, and channel estimation pilots are all part of a preamble stored in packet detection preamble block 215. Thus, symbols associated with regions 401 and 402 are stored as a preamble in packet detection preamble block 215.

Pilot insertion module 214 is for inserting frequency tracking pilots within STBC-encoded symbols. Because PHY 200 is implemented at least in part using programmable logic, guard bands associated with unused subcarriers of regions 405 may be defined by a user. Accordingly, such guard bands may vary from application to application depending on the frequency band and the amount of banding a user implements. Accordingly, FIFO 220 may store packet preamble, followed by channel estimation pilots, followed by data payload for each packet in the proper sequence.

As should be appreciated, OFDM block 250 is a single block which may be coupled to multiple transmitters to support multiple antennas. Furthermore, because a single OFDM block 250 may be used with multiple antennas, a single cascade of memory, for example FIFOs 212 and 220, may be used.

If the MIMO encoding is spatial multiplexing instead of STBC encoding, data streams are fed through to pilot insertion module 214 without STBC encoding. It should be appreciated that pilot insertion module 214 loads STBC-encoded data symbols onto data subcarriers and loads frequency tracking pilots onto pilot subcarriers.

Thus FIFO 220 holds ordered packet symbols, such as may be structured according to packet structure 400 of FIG. 4. Responsive to assertion of start signal 222, IFFT block 221 loads output from input FIFO 220 for a packet. IFFT block 221 performs an IFFT on a packet. When a packet is being loaded into IFFT block 221, a previous packet may be simultaneously unloaded as complex output 231 from a respective FIFO of "output" FIFOs 230 for transmission.

The output of IFFT block 221 is provided to cyclic prefix/postfix insertion module 223. Cyclic prefix/postfix information is inserted by cyclic prefix/postfix insertion module 223 into IFFT transformed symbols of a packet. IFFT block 221 may provide a busy signal 224 to cyclic prefix/postfix insertion module 223 until an IFFT of a packet is completed. The output of IFFT symbols along with cyclic prefix/postfix information from cyclic prefix/postfix insertion module 223 is provided to spatial demultiplexer 225. Spatial demultiplexer 225 demultiplexes such output from cyclic prefix/postfix insertion module 223 into a respective output FIFO of output FIFOs 230. Notably, the output from output FIFOs 230 is a complex output 231, namely with real and imaginary portions. Furthermore, this spatial demultiplexing maintains packets together, such that an entire packet of one transmit antenna is buffered in a single output FIFO of output FIFOs 230, and symbols for the second antenna are buffered in the second single output FIFO of output FIFOs 230 and so on for all the transmit antennas.

Figure 3:
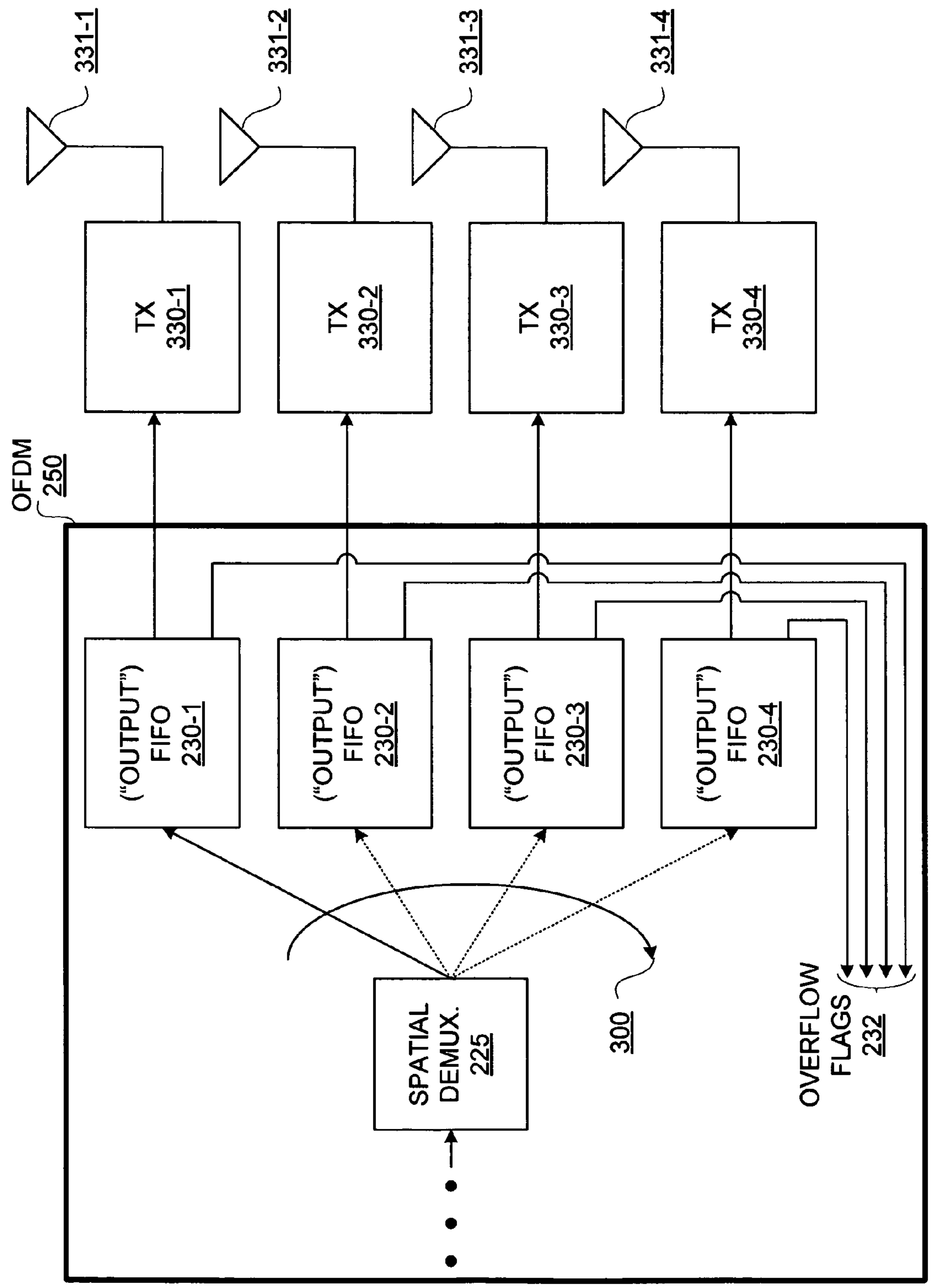
FIG. 3 is a block diagram depicting an exemplary embodiment of the Multiple-Input, Multiple-Output Orthogonal Frequency Division Multiplexing block of FIG. 2 coupled to four transmitters.

FIG. 3 is a block diagram depicting an exemplary embodiment of OFDM block 250 of FIG. 2 coupled to transmitters 330-1 through 330-4. Notably, though the example of a four antenna transmitter is illustratively shown, it should be appreciated that fewer or more than four antennas may be used. Transmitters 330-1 through 330-4 are respectively coupled to antennas 331-1 through 331-4.

Spatial demultiplexer 225 may sequentially output information to output FIFOs 230-1 through 230-4 (collectively, FIFOs 230) as indicated by arrow 300. Notably, packet information is demultiplexed to the appropriate output FIFO depending on the number of transmit antennas being used. Thus, packets are distributed among output FIFOs 230, with each FIFO of FIFOs 230 receiving a respective packet for transmission. Each of transmitters 331-1 through 331-4 may include a digital-to-analog converter ("DAC"), as is known. Information is respectively passed from FIFOs 230-1 through 230-4 to transmitters 330-1 through 330-4 responsive to assertion of start PHY flag 241.

With simultaneous reference to FIGS. 2 and 3, overflow flags 219 and 232 are respectively provided as data inputs to NOR gate 218. For example, an overflow flag 219 may be provided from input FIFO 220 to a data input of NOR gate 218 responsive to being at approximately 75 percent of full capacity. Furthermore, by way of example and not limitation, overflow flags 232 respectively associated with output FIFOs 230-1 through 230-4 may be provided as data inputs to NOR gate 218 with a same or different indicator amount, which for purposes of clarity shall be assumed to be the same, namely an indication of approximately 75 percent of full capacity of each of those FIFO output buffers. The output of NOR gate 218 may be provided to an enable port of symbol FIFO 212.

Accordingly, if an overflow flag is asserted, such as any of overflow flags 232 or overflow flag 219, symbol FIFO 212 may be disabled in order to pause operation until the buffer or buffers issuing such overflow indicators have subsided below the overflow condition. Thus, it should be appreciated that overflow flags may be used as a handshaking mechanism to insure that symbols are not lost within a transmit chain provided by PHY 200. While operation of PHY 200 may be at a frequency at least 6× that of the baud rate of transmitters 330-1 through 330-4, it should be appreciated that transmitters 330-1 through 330-4 have rates of transmission very close if not exactly equivalent to each other.

Figure 5:
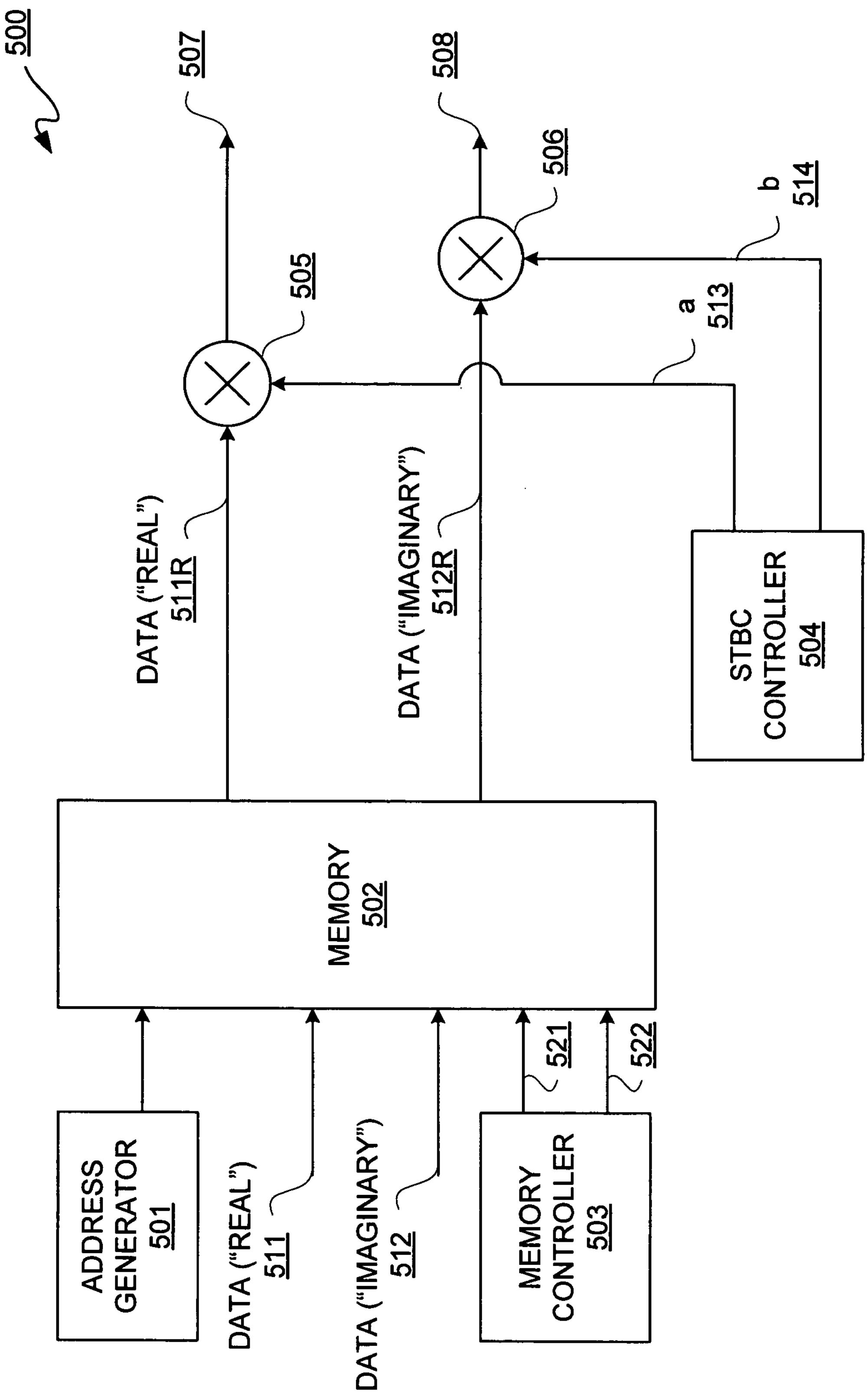
FIG. 5 is a block diagram depicting an exemplary embodiment of a Space-Time Block Code ("STBC") encoder.

FIG. 5 is a block diagram depicting an exemplary embodiment of an STBC encoder 500. STBC encoder 500 may be STBC encoder 213 of FIG. 2. STBC encoder 500 includes address generator 501, memory 502, memory controller 503, STBC controller 504, and multipliers 505 and 506. Memory 502 for an FPGA implementation using FPGA 100 of FIG. 1, for example, may be implemented using a single BRAM 103. Furthermore, multipliers 505 and 506 may be implemented using DSPs 106 of FIG. 1.

Symbols provided from FIFO 212 of FIG. 2 may be provided to STBC encoder 500 as complex numbers. These symbols have a real portion and an imaginary portion associated with the axes or rails defining associated amplitudes. The real data portion 511 and the imaginary portion 512 of each complex number associated with each symbol output from symbol FIFO 212 is input to memory 502. It should be appreciated that because a single transmission path is used for multiple transmitters, memory utilization, for example of memory 502 of STBC encoder 500, may be enhanced. Furthermore, it should be appreciated that for STBC encoding, real and imaginary symbols from a prior iteration may be used in a subsequent encoding iteration, as described below in additional detail. Additionally, as shall be appreciated, data associated with multiple antennas for transmitting on multiple subcarriers or subchannels may be associated for STBC encoding, as described below in additional detail.

The number of data symbols for a packet, namely $N_{ds}$, times the number of transmitting antennas supported by a single OFDM block 250 transmission path or paths, namely $N_{Tx}$, is the effective number of symbols written from symbol FIFO 212 to memory 502 of STBC encoder 500 for a packet. Thus the symbols written to memory 502, in the amount of $N_{ds}$ times $N_{Tx}$, may be stored in consecutive order in memory 502, which for this example may be a single BRAM 103 of a Xilinx FPGA.

For purposes of clarity by way of example and not limitation, it shall be assumed that IFFT block 221 of FIG. 2 implements a 64 point transformation. Notably, the amount of data stored for this example in memory 502 would support IFFTs on each supported transmitter. Thus, for example, assuming there are 64 samples or points for each transmitting antenna, and each sample may be for example 16 bits (8 bits for real and 8 bits for imaginary), then to support four transmitting antennas a BRAM having a 16 by 256 memory array dimension may be used for memory 502. In a Xilinx FPGA, BRAM 103 may be 64 kilobits of memory. Notably, actual memory array dimensions may vary provided total memory is sufficient. However, for purposes of clarity by way of example, it shall be assumed that each row of memory is capable of storing the full number of sample bits for a sample. Moreover, even though some of the addressable memory in memory 502 may go unused, it should be appreciated that the effective utilization is still greater than if separate memories, for example each being of 64 kilobits, were used for separate transmission paths. For a conventional use of separate memories of 64 kilobits, only 1024 bits (16 by 64) of each memory would be used for each antenna, thereby wasting significant memory resources.

For purposes of clarity by way of example and not limitation, it shall be assumed that there are 64 subcarriers, namely $N_{ds}$ is equal to 64, and there are two transmitting antennas, namely $N_{Tx}$ is equal to two. Though the example of four antennas is used above, it should be appreciated from the description of two transmitting antennas that more than two transmitting antennas may be used.

Memory 502 therefore receives 64 samples for each antenna, each of which for example may be 16 bits long, namely 8 bits of real data 511 and 8 bits of imaginary data 512. Thus, rows 0 through 127 of memory 502 may be populated with 128 respective samples of real and imaginary data. Symbols from symbol FIFO 212 may be written to memory 502 in consecutive order responsive to a write enable signal 521 and a memory enable signal 522 provided from memory controller 503. The first 64 samples written to memory 502 may be for one antenna and the second 64 samples written to memory 502 may be for another antenna in the 0 to 127 rows of samples. Accordingly, address generator 501 may sequentially read out each of the samples 0 through 127. Notably, the enable port on memory 502 may be coupled to receive output of NOR gate 218, though not illustratively shown for purposes of clarity, to disable encoding if an overflow condition arises.

Address generator 501 may generate a sequence of addresses, namely a consecutive order of addresses for writing to or reading from memory 502. Thus, in one OFDM symbol interval, samples or symbols are written to memory 502 and simultaneously read from memory 502, and in a subsequent OFDM symbol interval, symbols are only read from memory 502.

STBC controller 504 provides operands 513 and 514, namely a and b respectively, as respective inputs to multipliers 505 and 506. Operands 513 and 514 are used for passing, conjugating, or negating symbols associated with STBC encoding. The symbols that are passed, conjugated, or negated are read from memory 502, namely real data 511R and imaginary data 512R. Real data 511R is provided as an input to multiplier 505 and imaginary data 512R is provided as an input to multiplier 506. Thus, the output of multiplier 505 may be real data 511R multiplied by operand a 513, namely STBC-encoded real output 507. Furthermore, the output of multiplier 506 may be imaginary data 512R multiplied by operand b 514 to provide STBC-encoded imaginary output 508. The combination of STBC encoded real and imaginary outputs 507 and 508 may be mathematically expressed as a(d1)+jb(d2), the quantity of which may be negated or conjugated, or the individual data values d1 and d2 may be negated, where d1 is real data 511R and d2 is imaginary data 512R.

The example of STBC encoding for two transmit antennas as described herein is generally known as Alamouti code. FIG. 6A is a matrix diagram depicting an exemplary embodiment of an Alamouti code matrix 600A for two antennas. Symbols $c_1$ and $c_2$ are transmitted from antennas 1 and 2 respectively during OFDM symbol interval 1 on a subcarrier k. During the next symbol interval, namely OFDM symbol interval 2, symbols $-c_2^*$ and $c_1^*$, where the asterisk indicates the symbol has been conjugated, are respectively transmitted from antennas 1 and 2 on the same subcarrier k as used during OFDM symbol interval 1. This code has a block length of 2 and is a Rate 1 code, as two data symbols are transmitted from two antennas over two time intervals. Moreover, for this example, k may be any of the 64 subcarriers.

Returning to the example, during an OFDM symbol interval 1, symbols associated with $c_1$, which are stored at rows 0 through 63, are read for multiplication of real and imaginary portions respectively by operands a and b both set equal to 1. Symbols associated with $c_2$, which are stored at rows 64 through 127, are likewise read during OFDM symbol interval 1 for multiplication of real and imaginary portions by respective operands a and b both set equal to 1. Symbols associated with $c_1$ and $c_2$ are respectively transmitted on antenna 1 and antenna 2. Thus, the symbols are effectively passed through STBC encoder 500 of FIG. 5.

On a subsequent OFDM symbol interval 2, because a negated conjugate of $-c_2^*$ is to be transmitted on antenna 1, symbols associated with rows 64 through 127 are read out from memory 502 with operand a set equal to −1 and operand b set equal to 1. This is because −(a(d1)+jb(d2))* is equal to (−a(d1)+jb(d2)). In accordance with STBC encoding, $c_1^*$ is transmitted on antenna 2. Accordingly, for continuing the above example, symbols associated with rows 0 through 63 are read out from memory 502 for transmitting on antenna 2 where operand a is set to 1 and operand b is set to −1.

FIG. 6B is a matrix diagram depicting an exemplary embodiment of an operand matrix 600B for the above example. In operand matrix 600B, the first column is the multiplier operand for the real part, namely operand a, and the second column is the multiplier operand for the imaginary part, namely operand b. These operand multipliers a and b may be used to generate STBC symbols, for each symbol interval including for example $-c_2^*$, and $c_1^*$ of STBC code matrix 600A of FIG. 6A.

With combined reference to FIGS. 5, 6A, and 6B, address generator 501 for the above example of two transmitting antennas may be more generally described as providing 0 to $(N_{ds}-1)$ and $N_{ds}$ to $(2N_{ds}-1)$ addresses for an OFDM symbol interval on a subcarrier, followed by addresses $N_{ds}$ to $(2N_{ds}-1)$ and 0 to $(N_{ds}-1)$ for an immediately subsequent OFDM symbol interval for transmission on the same subcarrier. Notably, it should be appreciated that $N_{ds}$ indicates the number of data symbols excluding pilot symbols, preamble symbols, or unused or zero valued symbols. Thus, $N_{ds}$ is actually the number of data subcarriers, which is a smaller subset than the number of IFFT points as preamble and pilot symbols are processed by IFFT block 221.

Accordingly, it should be appreciated that by using a single memory to support multiple transmitters, symbols associated with transmission on one antenna, which are also associated with transmission on another antenna, though they may be in a negated form, a conjugated form, or a negated and conjugated form, need not be rewritten into such memory. This avoids having extra write cycles for cross-coupling memories for sharing symbol information.

Accordingly, symbols associated with OFDM symbol interval 1 are written to memory 502, for example, while write enable signal 521, as well as memory enable signal 522, are asserted from memory controller 503 to memory 502. However, on OFDM symbol interval 2, as it is not necessary to write symbols to memory 502, the write enable signal from memory controller 503 is not asserted. By switching read order of top and bottom halves, symbols in a bottom half may be sequentially addressed, followed by sequentially addressing the symbols in a top half.

FIG. 6C is a matrix diagram depicting an exemplary embodiment of an STBC encoding matrix 600C for three transmitting antennas. Accordingly, there may be three sets of symbols, namely sets $c_1$, $c_2$, and $c_3$. Note that for STBC encoding matrix 600C, zeros may be transmitted on some of the antennas during some symbol intervals. Thus, this is a Rate ¾ system having a block length of 4.

FIG. 6D is a matrix diagram depicting an exemplary embodiment of an STBC encoding matrix 600D for four transmitting antennas. Accordingly, there may be four sets of symbols, namely $c_1$, $c_2$, $c_3$, and $c_4$. The four antenna STBC encoding transmission path associated with STBC encoding matrix 600D is for a Rate ½ code having a block length of 8.

Although the foregoing examples have been for STBC encoding, it should be appreciated that spatial multiplexing for a MIMO-OFDM transmission path may be used. For example, for the case of two transmitting antennas for a spatial multiplexing MIMO-OFDM transmission path, memory 502, which again may be implemented using a single BRAM for example, may be configured as a feed through path, as every OFDM symbol has completely independent data. This example of a two transmitting antenna spatial multiplexing transmission path may have a block length of 1 and may be a Rate 2 system.

Accordingly, it should be appreciated that in addition to memory sharing, time multiplexing may also be used, as STBC encoding using same data sets of symbols for multiple transmission antennas may be implemented by adjusting multiplier operands according to the OFDM symbol interval. These symbol intervals are time intervals, and thus a form of time multiplexing is provided.

Figure 7:
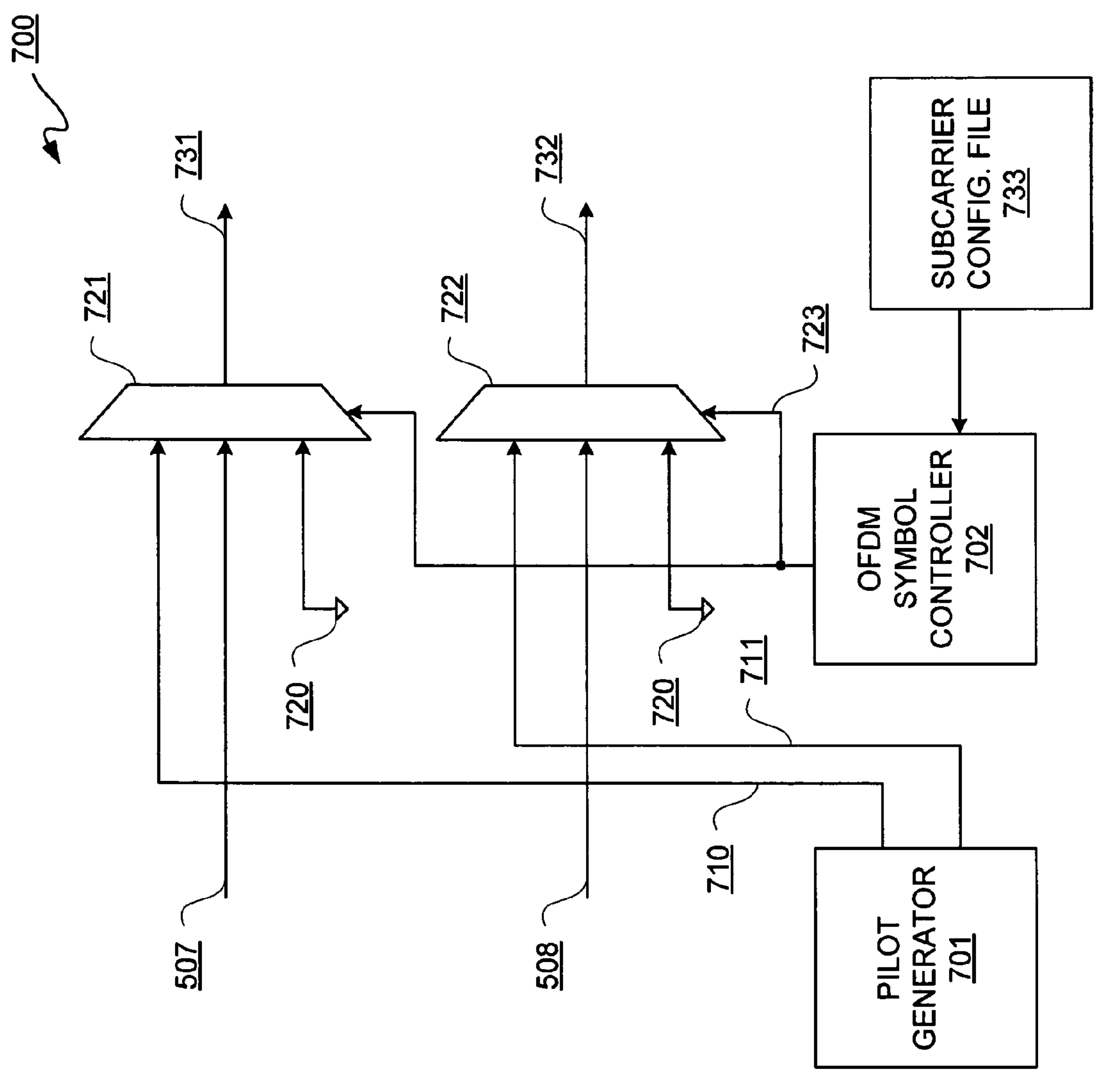
FIG. 7 is a block/schematic diagram depicting an exemplary embodiment of a pilot insertion and data loading module.

FIG. 7 is a block/schematic diagram depicting an exemplary embodiment of a pilot insertion and data loading module 700. Pilot insertion and data loading module 700 may be pilot insertion module 214 of FIG. 2. Pilot insertion and data loading module 700 includes multiplexers 721 and 722, pilot generator 701, and OFDM symbol controller 702. Pilot sequences are interspersed with data payload. On some subcarriers pilot sequences are provided, and on other subcarriers data payload is provided. Thus, pilot insertion and data loading module 700 keeps track of what subcarrier is being associated with the information being provided. If the subcarrier is an unused subcarrier, such as an unused subcarrier at DC and at band edges of a frequency band, then pilot insertion and data loading module 700 inserts zeros, as indicated by ground 720, as respective inputs to multiplexers 721 and 722. Tracking of data subcarriers means that STBC-encoded real and imaginary outputs 507 and 508 are loaded onto data subcarriers. Accordingly, real output 507 is provided as a data input to multiplexer 721 and imaginary data output 508 is provided as a data input to multiplexer 722. Lastly, by tracking whether pilot subcarriers are to be used, pilot symbols may be loaded onto such pilot subcarriers. Accordingly, pilot generator 701 generates real pilot symbols 710 and imaginary pilot symbols 711. Real pilot symbols 710 are provided to a data input of multiplexer 721 and imaginary pilot symbols are provided to a data input of multiplexer 722.

Pilot generator 701 may generate, for example, 4-QAM symbols that are placed on pilot subcarriers of all transmitting antennas. Thus all transmitting antennas may have the same pilot on any pilot subcarrier; however, the pilots on different pilot subcarriers may be different. Accordingly, different sets of pilots may be generated for each OFDM symbol, or more particularly OFDM symbol interval.

OFDM symbol controller 702 provides a control select signal to a control select port of multiplexers 721 and 722. OFDM symbol controller 702 selects as between pilots, zeros, or data for controllably providing real output 731 from multiplexer 731 and imaginary output 732 from multiplexer 722. Whether pilots, zeros, or data are output depends on the subcarrier, and thus pilots, zeros, or data are output from multiplexers 721 and 722 corresponding to an appropriate subcarrier location. Pilot, data, and unused subcarriers may be specified in a subcarrier configuration file 733 accessible by OFDM symbol controller 702, from which data subcarriers can be inferred.

Figure 8:
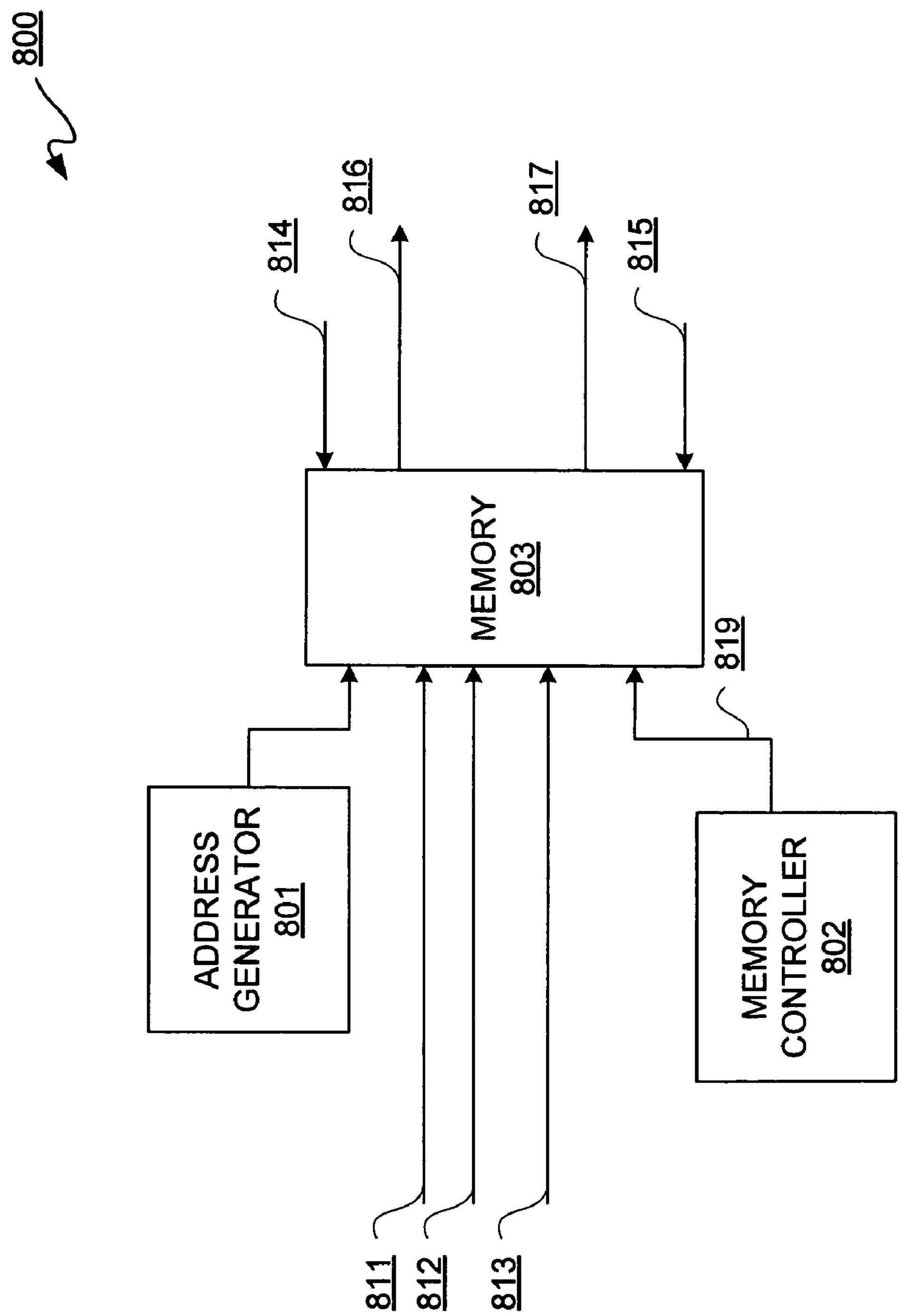
FIG. 8 is a block diagram depicting an exemplary embodiment of a cyclic prefix/postfix insertion module.

FIG. 8 is a block diagram depicting an exemplary embodiment of a cyclic prefix/postfix insertion module 800. Insertion module 800 includes address generator 801, memory controller 802, and memory 803. Insertion module 800 may be cyclic prefix/postfix insertion module 223 of FIG. 2.

Memory 803 may be implemented as a single BRAM, such as a BRAM 103 of FIG. 1. As IFFT time domain data is unloaded, it may be written to a single port of memory 803. Notably, this time domain data includes both real and imaginary data as indicated by respective data signals 811 and 812 provided to memory 803. An IFFT data valid signal 813 may be provided to a write enable port of memory 803 to activate writing of data via data signals 811 and 812 to memory 803. Memory controller 802 may output a memory enable signal 819 which is provided to memory 803. Address generator 801 may issue consecutive addresses as previously described with respect to memory 502 of FIG. 5 and writing thereto of addresses generated by address generator 501.

When data valid signal 813 is not asserted, such as at a logic low level, cyclic prefix and cyclic postfix may be inserted as memory 803 is read. A location up to which memory 803 is read to insert a cyclic postfix may be provided to memory 803 via location signal 814. Moreover, a location at which memory 803 starts reading to insert a cyclic prefix may be provided via location signal 815 provided to memory 803.

Memory 803 may be read starting at the ($N_{ds}$-$C_{pre}$) location, where $C_{pre}$ is the cyclic prefix location, and wrap around to address 0 after reading all $N_{ds}$ samples, and then wrap around again to read the cyclic postfix, namely up to location $C_{post}$, where $C_{post}$ is the cyclic postfix location. Accordingly, address generator 801 may be configured to generate the appropriate addresses for inserting cyclic prefix and cyclic postfix. Memory controller 802 generates enable signal 819 for memory 803, as well as read and write signals not shown, depending on the data valid signals of IFFT 221 of FIG. 2. Output of memory 803 therefore may be real and imaginary data, namely real output 816 and imaginary output 817 along with locations having cyclic prefix $C_{pre}$ and cyclic postfix $C_{post}$ for each of outputs 816 and 817.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners.

What is claimed is:

1. An integrated circuit having blocks of memory of a fixed size, the integrated circuit comprising:

a physical layer block configured for Multiple-Input, Multiple-Output Orthogonal Frequency Division Multiplexing ("MIMO-OFDM");

the physical layer block being a single MIMO-OFDM block for supporting transmitting via a plurality of antennas;

wherein the physical layer block includes buffers configured for storing sets of symbols at a time for the transmitting respectively via the plurality of antennas;

wherein the buffers comprise block random access memories; and wherein the buffers include a symbol buffer, an input buffer, and output buffers, the symbol buffer being implemented with a single first block random access memory of the block random access memories, and the input buffer being implemented with a single second block random access memory of the block random access memories.

2. The integrated circuit according to claim 1, wherein the integrated circuit comprises a programmable logic device.

3. The integrated circuit according to claim 1, wherein there is a one-to-one correspondence between the output buffers and the plurality of antennas; and wherein each of the output buffers, the symbol buffer, and the input buffer are configured for first-in, first out operation.

4. The integrated circuit according to claim 1, further comprising a Space-Time Block Code ("STBC") encoder coupled between the symbol buffer and the input buffer, the symbol buffer being coupled to receive mapped symbols for encoding by the STBC encoder to provide STBC-encoded symbols.

5. The integrated circuit according to claim 4, wherein the mapped symbols are written into a single third block random access memory of the block random access memories, the single third block random access memory being part of the STBC encoder, the STBC encoder being configured to store the mapped symbols as at least a first set and a second set, the first set and the second set being part of the sets of symbols stored.

6. The integrated circuit according to claim 5, wherein the first set and the second set are read in a first read operation and a second read operation from the single third block random access memory, the first read operation and the second read operation being in respective consecutive symbol intervals for STBC encoding, the first read operation from the single third block random access memory comprising a reading of the first set followed by a reading of the second set, the second read operation from the single block random access memory comprising a reading of the second set followed by a reading of the first set.

7. The integrated circuit according to claim 6, wherein the first set and the second set read are each multiplied by a first operand and a second operand, the first operand being associated with a real portion of complex numbers of the first set and the second set, and the second operand being associated with an imaginary portion of complex numbers of the first set and the second set.

8. The integrated circuit according to claim 7, wherein the first operand and the second operand are different as between the two consecutive symbol intervals.

9. The integrated circuit according to claim 1, further comprising a spatial multiplexer coupled between the symbol buffer and the input buffer, the symbol buffer being coupled to receive mapped symbols for spatial multiplexing by the spatial multiplexer.

10. The integrated circuit according to claim 1, further comprising a spatial demultiplexer coupled between the input buffer and the output buffers, the spatial multiplexer being configured for spatial demultiplexing of the sets of symbols for segregated distribution to the output buffers.

11. The integrated circuit according to claim 10, wherein the physical layer block is configured for frame-based operation.

12. The integrated circuit according to claim 10, wherein the physical layer block is configured for packet-based operation.

13. An integrated circuit having blocks of memory of a fixed size, the integrated circuit comprising:

a physical layer block configured for Multiple-Input, Multiple-Output Orthogonal Frequency Division Multiplexing ("MIMO-OFDM");

the physical layer block being a single MIMO-OFDM block for supporting transmitting via a plurality of antennas;

wherein the physical layer block includes buffers configured for storing sets of symbols at a time for the transmitting respectively via the plurality of antennas; and wherein the physical layer block is clocked responsive to a system clock signal, the system clock signal being greater in frequency than a sample clock signal used for the transmitting via the plurality of antennas, the system clock signal being sufficiently greater in frequency than the sample clock signal for multiplexing transmissions to the physical layer block for the transmitting via the plurality of antennas.

14. The integrated circuit according to claim 13, wherein the buffers include a symbol buffer, an input buffer, and output buffers, at least one of the symbol buffer and the input buffer being implemented with a single block random access memory of the block random access memories for storing the sets of symbols for all of the plurality of antennas.

15. A method for transmission of information via a single transmit path, comprising:

obtaining mapped symbols for the transmission of the information via a plurality of antennas;

first buffering the mapped symbols;

performing one of a spatial multiplexing and a Space-Time Block Code ("STBC") encoding of the mapped symbols, the mapped symbols being divided responsive to the antennas and channels respectively associated therewith;

inserting preamble symbols;

inserting frequency tracking symbols;

concatenating the preamble symbols, the frequency tracking symbols, and the mapped symbols to provide a symbol grouping;

second buffering the symbol grouping;

inverse Fourier transforming the symbol grouping;

spatial demultiplexing the symbol grouping to an output buffer; and third buffering the symbol grouping in the output buffer for an associated one of the antennas;

wherein a system clock provided to the single transmit path is sufficiently higher in frequency than a sample clock for multiplexing multiple transmissions including the transmission onto the single transmit path.

16. The method according to claim 15, wherein the single transmit path is coupled to transmitters respectively coupled to the antennas, and wherein the output buffer comprises a plurality of buffers corresponding to the antennas.

17. The method according to claim 16, further comprising:

forward error correcting and interleaving to provide the mapped symbols;

multipoint quadrature amplitude modulating to provide the mapped symbols; and inserting a cyclic prefix and a cyclic postfix in the symbol grouping.

18. The method according to claim 17, wherein the symbol grouping is for a packet; and wherein the single transmit path is instantiated in a programmable logic device.

* * * * *